T. GORDON.
CHASSIS FOR MOTOR CYCLE SIDE CARS.
APPLICATION FILED AUG. 21, 1920.
1,425,380.
Patented Aug. 8, 1922.
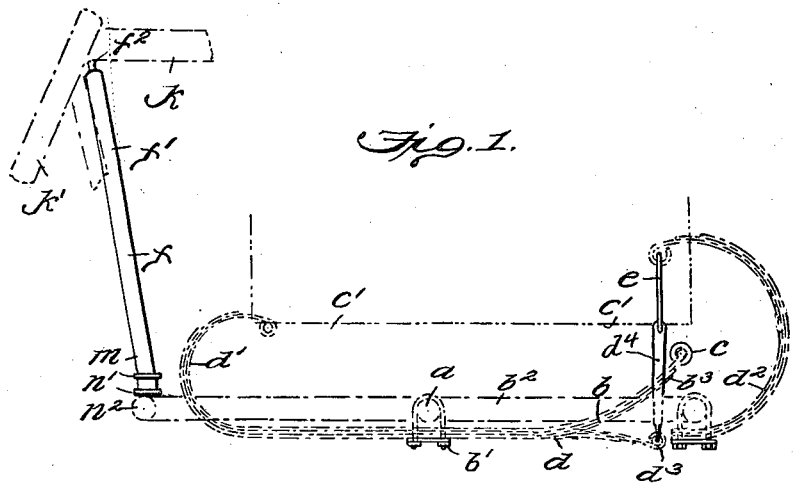
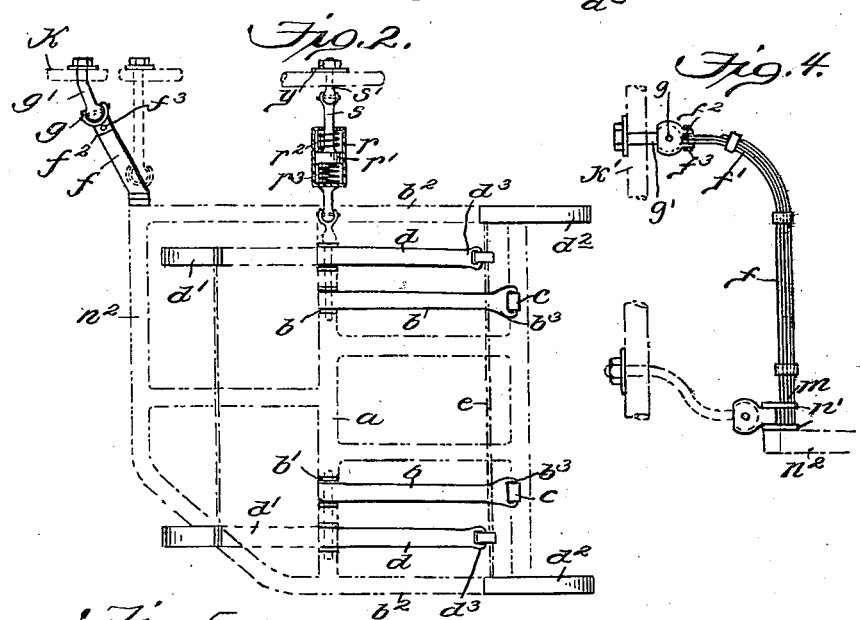
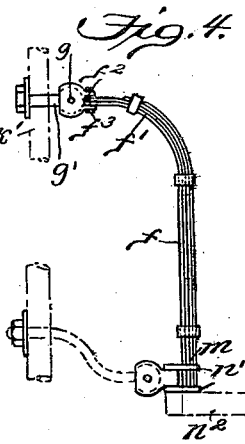
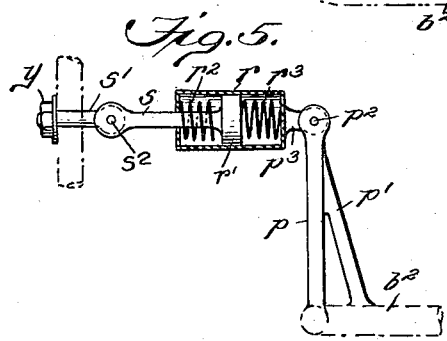
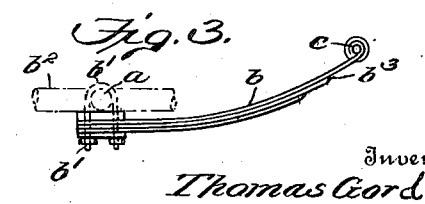
Inventor
Thomas Gordon
By
Attorney

UNITED STATES PATENT OFFICE.

THOMAS GORDON, OF PERTH, WESTERN AUSTRALIA, AUSTRALIA.

CHASSIS FOR MOTOR-CYCLE SIDE CARS.

1,425,380.   Specification of Letters Patent.   Patented Aug. 8, 1922.

Application filed August 21, 1920. Serial No. 405,192.

*To all whom it may concern:*

Be it known that I, THOMAS GORDON, a subject of the King of Great Britain, residing at 261 Murray Street, Perth, Western Australia, Commonwealth of Australia, have invented certain new and useful Improvements in Chassis for Motor-Cycle Side Cars, of which the following is a specification.

This invention embodies certain new and useful improvements in and additions to the chassis of the side cars of motor cycles whereby special provision is made for their more effective and better spring equipment and structural resiliency than has heretofore been devised.

The invention essentially comprises four main structural factors and advantages:—

1. Improved springing and seating by means of auxiliary springs at the rear end of the chassis, so designed that varying loads automatically bear on these springs and bring them into use and action with the result that perfect springing and equal distribution of the load is obtained.

These springs are in perfect and automatic agreement and obedience with varying loads on the car and with the result that the car and its occupants are not subjected to over bumping when the car is running with a reduced or minimum load.

A further advantage arising from the use of the auxiliary springs is that the side car may be made of larger size and adapted to carry heavier loads than hitherto. In the use of these springs when the load is increased in excess of the capabilities of the existing springs and owing to the resultant depression of the car body—the latter makes operative and seating contact with the auxiliary springs the result being that the car when bearing its excess load is seated on its total spring equipment.

2. Black lash or rebound springs are employed and connected to the main existing springs by a stout leather strap attached to rear cross bar of the chassis. These springs have the effect of preventing any sudden rebound of the car caused by the road shocks while at the same time imparting a gentle up and down springing movement.

3. A front steering leaf spring is employed which consists of an attachment fitted on the front of the chassis and the head of the motor cycle. To obtain maximum effect this spring steering attachment is placed as high up and forward as possible to the head of the frame of the motor cycle thus giving complete and positive control over the steering. Without this front leaf steering spring the tendency of a heavily laden side car is to drag the motor cycle to that side on which the side car is attached, thus resulting in excess side strain and pull to the frame and causing excessive fatigue to the driver. These objectionable features are eliminated by the use of my invention; all side drag being absent and nullified and it further enables the side car to be steered comfortably and with a positive responsive action and movement.

4. An intermediate and central stay is employed between the body frame of the motor cycle and that of the side car. This stay is arranged in a flexible and yieldable manner with the result that when the side car is passing over an obstacle it will have the tendency to lean or tilt towards the cycle and then readily reassert and resume its position and without being subjected to over side strain or shock.

The construction and use of the invention will now be explained with the aid of the attached drawings wherein Fig. 1 is a side elevation showing the arrangement and disposition of the auxiliary; the rebound and the front steering leaf spring as fitted on the chassis of the side-car. Fig. 2 is a plan view of same.

Fig. 3 is a detail elevation of the auxiliary springs. Fig. 4 is a front view of the front steering leaf spring. Fig. 5 is a front view of the intermediate central stay; in same the piston and springs are shown in their neutral or normal position. In these views the existing members of the chassis are denoted by broken lines. Referring to said drawings—on the central cross stay bar as $a$ of the chassis or under frame of the side car is anchored and secured a group of leaf springs as $b$ by U bolt as $b^1$. A group of said springs as $b$ being employed near each inner side bar as $b^2$ of the chassis.

These springs $b$ act as the auxiliary springs and are of an upwardly and rearwardly curved form towards their terminals $b^3$ and thereat and thereon carry a free and loose running roller as $c$ whose function is to make seating contact at a rear position with the underside of the floor as $c^1$ of the car. On the said central stay bar and on the outside of each group of auxiliary springs as $b$ is anchored a group of rebound springs as $d$ which are of a downwardly and rearwardly curved form. These rebound springs $d$ may in some cases form a continuation or extension of the ordinary front group of C shaped springs as $d^1$ of the chassis; see Fig. 1. The special function and purpose of said rebound springs $d$ is to receive the backlash or recoil of the main rear C shaped springs as $d^2$ and thus absorb all resultant and violent road shocks and jar. On the rear end of each group of rebound springs as $d$ is fitted a buckle $d^3$ to therein receive a leather strap $d^4$ which flexibly connects with the rear cross bar $e$ to which is anchored the pair of rear C shaped springs $d^2$ and to said bar $e$ the body of the side-car is bolted.

The front steering group of leaf springs as $f$ (see Fig. 4) at its head terminal $f^1$ is secured in the jawed bracket $f^2$ by the through bolt $f^3$ said bracket $f^2$ is hingeably and freely carried on the pin $g$ held in the anchor stem $g^1$ and which is bolted frontwardly at a high position on or near to the junction of the top stay bar $k$ and steering pillar $k^1$ of the cycle.

This steering spring $f$ at its lower end $m$ is rigidly anchored by a shackle and U bolts $n^1$ to the front lower cross stay bar $n^2$ of the side car chassis.

Referring to Fig. 5, in which is shown the intermediate and central stay.

This stay comprises a vertical fixed arm $p$ which at its base is rigidly secured to the inner side bar $b^2$ of the chassis and having a reinforcing or additional stay as $p^1$.

This arm $p$ at its head hingeably connects by pin $p^2$ with arm $p^3$. On the latter is carried the cylinder $r$ within which is operatively held the piston $r^1$ said piston being equipped at each end with coiled springs $r^2$—$r^3$ whose duty is to act as shock absorbing agents. The piston $r^1$ by its rod $s$ hingeably connects by pin $s^2$ with the anchor stem $s^1$ said stem by lock nut $y$ being rigidly secured at any suitable position to the body frame as of the motor cycle. This stay $p$ and member connects the side car to the motor cycle in a flexible and yieldable manner by means of the piston $r^1$ and springs $r^2$—$r^3$ and whereby all side strain and shock is gently absorbed and nullified.

What I claim as my invention and desire to secure by Letters Patent is:—

1. In a chassis suspension for cycle side cars, a frame, a side car having a floor resiliently supported on said frame and an auxiliary spring having an upwardly and rearwardly curved form and rollers carried at the ends of said spring and adapted to make supporting contact with the floor of said side car.

2. In a chassis suspension for cycle side cars, a chassis frame, main supporting springs secured to said frame having upwardly curved rear ends, a rear cross bar extending transversely of said frame and secured to the rear ends of said main supporting springs, a side car having a floor resting on said rear cross bar, rebound springs secured to said frame having a downwardly and rearwardly curved form, said springs being connected by straps to said rear cross bar.

3. A chassis for cycle side cars comprising a frame, resilient means carried by said frame for supporting said car, said means comprising a spring permanently supporting said side car and an auxiliary spring engageable within said side car upon a predetermined degree of flattening of said permanent supporting spring, due to increased loading of said side car, and a rebound spring flexing in opposition to the vibration of said permanent supporting spring and operatively connected thereto.

In testimony whereof I have hereunto set my hand in presence of two subscribing witnesses.

THOMAS GORDON.

Witnesses:
RICHARD SPARROW,
FRED H. LAMBERT.